US007851763B2

(12) United States Patent
Bendriem et al.

(10) Patent No.: US 7,851,763 B2
(45) Date of Patent: Dec. 14, 2010

(54) METHOD FOR IMPROVING CLINICAL DATA QUALITY IN POSITRON EMISSION TOMOGRAPHY

(75) Inventors: Bernard Bendriem, Knoxville, TN (US); Michael E. Casey, Louisville, TN (US); Charles C. Watson, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 12/622,623

(22) Filed: Nov. 20, 2009

(65) Prior Publication Data

US 2010/0148047 A1    Jun. 17, 2010

(51) Int. Cl.
*G01T 1/164* (2006.01)
(52) U.S. Cl. ................................. 250/363.03
(58) Field of Classification Search ............. 250/363.03
See application file for complete search history.

(56) References Cited

U.S. PATENT DOCUMENTS

| 4,755,679 | A |   | 7/1988 | Wong |  |
|---|---|---|---|---|---|
| 5,591,977 | A | * | 1/1997 | Green et al. | 250/363.03 |
| 5,998,793 | A | * | 12/1999 | Shao et al. | 250/369 |
| 6,521,893 | B2 |  | 2/2003 | Stark |  |
| 6,590,213 | B2 | * | 7/2003 | Wollenweber | 250/363.03 |
| 6,809,321 | B2 | * | 10/2004 | Rempel | 250/363.1 |

OTHER PUBLICATIONS

National Electrical Manufactures Association, Rosslyn, VA, NEMA Standards Publication NU Feb. 2001, Performance Measurements of Positron Emission Tomographs, 2001.

Daube, et al., "PET Performance Measurements Using the NEMA NU Feb. 2001 Standrad," J. Nucl. Med., vol. 43, pp. 1398-1409, Oct. 2002.

Strother et al., "Measuring PET Scanner Sensitivity: Relating Countrates to Image Signal-to-Noise Ratios Using Noise Equivalent Counts," IEEE Trans. Nuc. Sci., vol. 37, pp. 783-788, Apr. 1990.

Smith at al., "Comparisons of Clinical Performance with Standard Measures of PET Cameras," 1998 IEEE NSS and MIC Conf. Rec., No. M6-11, 1999.

Badawi et al., "A Simulation-Based Assessment of the Revised NEMA NU-2 70-cm Long Test Phantom for PET," 2001 IEEE NSS and MIC Conf. Rec., No. M6-6, 2002.

Lartizien et al., "Optimization of Injected Dose Based on Noise Equivalent Count Rates for 2- and 3- Dimensional Whole-Body PET," J. Nucl. Med., vol. 43, pp. 1268-1278, Sep. 2002.

* cited by examiner

*Primary Examiner*—David P Porta
*Assistant Examiner*—Mindy Vu
(74) *Attorney, Agent, or Firm*—Peter L. Kendall (57) ABSTRACT

A method for improving clinical data quality in Positron Emission Tomography (PET). The method provides for the processing of PET data to accurately and efficiently determine a data single-to-noise ratio (SNR) corresponding to each individual clinical patient scan, as a function of a singles rate in a PET scanner. The method relates an injected dose to the singles rate to determine $SNR(D_{inj})$, and provides an accurate estimate of a quantity proportional to SNR, similar in function to the $SNR(D_{inj})$. Knowledge of $SNR(D_{inj})$ permits determination of peak SNR, optimal dose, SNR deficit, dose deficit, and differential dose benefit. The patient dose is fractionated, with a small calibration dose given initially. After a short uptake, the patient is pre-scanned to determine T, S, and R. An optimal does is then determined and the remainder injected.

11 Claims, 8 Drawing Sheets

METHOD FOR IMPROVING CLINICAL DATA QUALITY IN POSITRON EMISSION TOMOGRAPHY

CROSS-REFERENCE TO RELATED APPLICATIONS

This application claims the benefit of U.S. Provisional Application No. 60/520,029, filed Nov. 14, 2003.

STATEMENT REGARDING FEDERALLY SPONSORED RESEARCH OR DEVELOPMENT

Not Applicable

BACKGROUND OF THE INVENTION

1. Field of Invention

The present invention pertains to the field of Positron Emission Tomography (PET). More particularly, this invention relates to a method for improving the quality of clinical data in PET.

2. Description of the Related Art

The statistical precision of PET coincidence data is characterized by its signal-to-noise ratio (SNR), which is defined as the ratio of the mean N of the data to its root mean square (standard) deviation σ. Using the approximation that the deviations of the true, random and scattered coincidences from their respective mean values are uncorrelated and Poisson distributed, and assuming that a noiseless estimate of the mean of the scatter is available, the SNR of the scatter- and randoms-corrected coincidence data can be expressed as:

$$SNR = \frac{N}{\sigma} = \left(\frac{T^2}{T+S+kR}\right)^{1/2} t^{1/2} = NECR^{1/2} t^{1/2},$$

where T is the rate of true coincidences detected, S is the scatter, and R is the randoms. k is a constant between 1 and 2 depending on the variance of the randoms estimate, where k=1 for no noise and k=2 for variance equal to the mean. t is the duration of the acquisition. The quantity $$\frac{T^2}{T+S+kR}$$

represents the noise equivalent count rate (NECR). These count rates may either be global or refer to spatially localized regions of the data that correspond to specific regions of interest in the object being imaged. See R. H. Huesman, "A new fast algorithm for the evaluation of regions of interest and statistical uncertainty in computed tomography," Phys. Med. Biol., vol. 29, pp. 543-552 (1984).

The National Electrical Manufactures Association (NEMA) has defined NECR as a standard for quantifying the count rate performance of PET scanners. See, for example, National Electrical Manufactures Association, Rosslyn, Va., NEMA Standards Publication NU 2-2001, *Performance Measurements of Positron Emission Tomogmphs*, (2001); M, E. Daube-Witherspoon, et al., "PET performance measurements using the NEMA NU 2-2001 standard," *J Nucl. Med.*, vol. 43, pp. 1398-1409 (October 2002); and S. C. Strother, et al., "Measuring PET scanner sensitivity: Relating countrates to image signal-to-noise ratios using noise equivalent counts," *IEEE Trans. Nuc. Sci.*, vol. 37, pp. 783-788 (April 1990). The standard measurement is performed on a 20 cm diameter, 70 cm long phantom and involves accurately estimating the scatter and randoms contribution to the data over an extended activity range. This measurement is intended to roughly approximate conditions of human whole-body scans.

Although it quantifies data quality, integral NECR is not necessarily a direct measure of image quality or clinical utility. One reason for this is that an NECR based on total count rates does not distinguish diagnostic from physiological regions of activity, the diagnostic regions being of interest. SNR is localized data regions of interest should be studied in order to make clinically relevant quantitative estimates. Yet integral NECR is meaningful as a relative criterion for selecting patient acquisition parameters to the extent that the rates of useful and extraneous events are simultaneously optimized. While there are exceptions, it is physically plausible that global optimization is usually worthwhile.

It is useful to characterize clinical data in terms of NECR in order to optimize parameters such as patient dose, uptake period, and frame duration. However, as a practical matter, estimation of NECR on patient data is difficult. R. J. Smith et al., "Comparisons of clinical performance with standard measures of PET cameras," 1998 *IEEE NSS and MIC Conf. Rec.*, no. M6-11 (1999), showed a correlation of the prompts and trues rates as a function of singles rates between patient data and standard phantom measurements, but did not evaluate NECR performance. R. D. Badawi et al., "A simulation-based assessment of the revised NEMA NU-2 70-cm long test phantom for PET," 2001 *IEEE NSS and MIC Conf Rec.*, no. M6-6 (2002), compared NEMA 70 cm phantom NECR results to Monte Carlo simulations of three anthropomorphic models on two scanners, employing computed information that is not readily available clinically. C. Lartizien et al., "Optimization of injected dose based on noise equivalent count rates for 2- and 3-dimensional whole-body PET," *J. Nucl. Med.*, vol. 43, pp. 1268-1278 (September 2002), have also evaluated patient data in terms of NECR. However, these studies used measurements on an anthropomorphic phantom to derive models for the prompt and delayed coincidence rates as a function of singles rates, and did not attempt to fit these models directly to the patient data, relying instead on the similarity between the phantom and patients.

Figure 1:
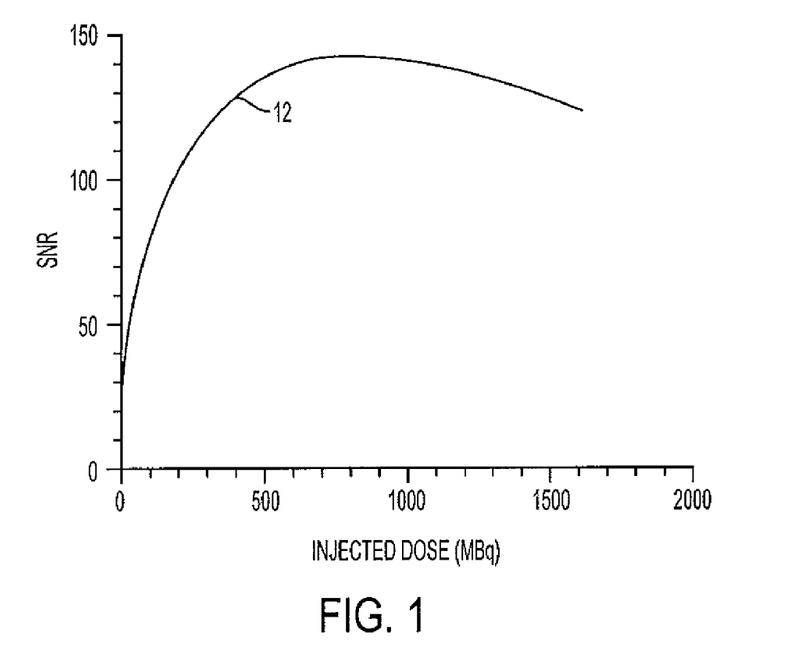
FIG. 1 is a graphical illustration of the signal-to-noise ratio of PET coincidence data as a function of a patients injected dose $D_{inj}$ after a 1 hour uptake.

Higher SNR implies relatively less noise in the data and is related to improved image quality. Thus it is desirable to maximize SNR for clinical acquisitions. To do this it is necessary to know the dependence of SNR on the patients injected dose $D_{inj}$ of radiopharmaceutical. FIG. 1 illustrates SNR as a function of a patient's injected dose $D_{inj}$ after a 1 hour uptake.

This relation depends on many quantities including the patient's weight and distribution of attenuating tissue, the distribution of the emitter in the body, the region of the body being scanned, the position of the patient in the scanner, and the uptake period. It also depends on various characteristics of the scanner itself, including its shielding, sensitivity, dead time per detected event, and its energy and time discrimination capabilities. In general, $SNR(D_{inj})$ is not known for clinical acquisitions. Only the single point illustrated at 12 in FIG. 1, corresponding to the actual acquisition, can typically be determined.

Direct measurement of $SNR(D_{inj})$ on a human subject using the most important radiopharmaceutical, $^{18}$F-FDG, takes several hours, during which the subject must remain motionless. $^{18}$F-FDG has a half-life of 109.77 min, and the $SNR(D_{inj})$ measurement does account for migration of activity in the body. Therefore, such measurement is not feasible.

Measurements made with a different, shorter-lived, radioisotope are not relevant to FDG due to potential differences in biodistribution.

Attempts have been made to determine $SNR(D_{inj})$ for patients by using Monte Carlo simulations and by making measurements on anthropomorphic phantoms. These techniques do not address all characteristics of particular patient scans and hence do not provide $SNR(D_{inj})$ for specific clinical imaging situations, but only offer general guidance. Further, they are time consuming to perform and hence not clinically practical. From the prior art, there is not an efficient, accurate means of estimating a patient- and scan-specific $SNR(D_{inj})$, or a quantity proportional to it, from a single clinical measurement.

Once $SNR(D_{inj})$ is known, it can be used to determine how to adjust injected dose, as well as other scan parameters, to optimize the tradeoffs among data quality, radiation dose to the patient, and scan time.

BRIEF SUMMARY OF THE INVENTION

The present invention is a method for improving clinical data quality in Positron Emission Tomography (PET). In the method of the present invention, data is processed to accurately and efficiently determine a data signal-to-noise ratio (SNR) corresponding to each individual clinical patient scan, as a function of a singles rate or similar parameter in a PET scanner. The method of the present invention relates an injected dose to the singles rate to determine $SNR(D_{inj})$. The method of the present invention further provides an accurate estimate of a quantity proportional to $SNR^2$, the estimate being similar in function to the $SNR(D_{inj})$, but being simpler to compute.

The singles rate is measured as a total over many crystals. The dead time, pile-up and multiplexing losses are fundamentally functions of the block singles rates. The data quality is characterized in terms of integral count rates over the region of interest, the total trues, randoms and singles:

$$T = \sum_{ij \varepsilon ROI} w_{ij} t_{ij};$$

$$R = \sum_{ij \varepsilon ROI} w_{ij} r_{ij};$$

and $$s = \sum_{i \varepsilon ROI} s_i$$

where $w_{ij}$, is a sinogram weighting factor and i and j are sinogram bin indexes. T and R are characterized in terms of the integral single rate. For any fixed object position, emitter distribution, and fixed scanner configuration, only the strength of the activity varies, and the integral rates T(s) and R(s) have simple functional forms defined as:

$$T(s) = c^T s f^T(s); \text{ and}$$

$$R(s) = c^R s^2 f^R(s),$$

where s represents the total measured singles rate, $c^T$ and $c^R$ are constants, and $f^T$ and $f^R$ are functions that account for data losses due to dead time, pile-up and multiplexing, but depend very little on the nature of the object being scanned. The object dependence is nearly entirely encapsulated in the scale factors $c^T$ and $c^R$ ... $f^T(s)$ and $f^R(s)$ depend very little on most scanner configuration parameters such as the pulse integration time, the energy discriminator settings, and the coincidence time window. $f^T(s)$ and $f^R(s)$ have similar, but not identical shapes.

Count rate models in which the independent variable is the integral single event rate of the scanner, s, have been discussed. However, alternative methods exist that serve as the model parameter in place of s. A measurable quantity is acceptable if it is uniquely related to the trues and randoms count loss fractions over the range of count rates of interest, without regard to the nature of the object being scanned; and if it exhibits a monotonic relation to the amplitude, A, of the activity present in the body over this range, for a given, fixed scan configuration. For a given parameter p, p may be any directly measured or derived quantity that is or could be employed to provide a dead time or count loss correction in a PET tomograph. Such quantities include, for example, the output of a live-time clock, the output of a pulse propagation circuit, and a quantity derived from the randoms coincidence rate itself. p may be either a scalar or vector quantity, for instance, either the integral singles rate, or a vector representing the singles rates in each detector. In any of these cases, p may be used in place of s to model the count rate response in clinical scans.

T(s) and R(s) are measured for a given scanner at one or more values of s using a phantom. The phantom is selected from a 70 cm long, 20 cm diameter phantom specified by the NEMA NU 2-2001 standard, an anthropomorphic phantom, or another appropriate distribution. The discrete measured values are interpolated or extrapolated using a polynomial or other appropriate function. From a patient measurement at a single activity level, the trues and randoms rates at any singles rate are determined according to:

$$T_{pat}(s) = \frac{T_{pat}(s_{pat}^{meas})}{T_{phant}(s_{pat}^{meas})} T_{phant}(s);$$

and $$R_{pat}(s) = \frac{R_{pat}(s_{pat}^{meas})}{R_{phant}(s_{pat}^{meas})} R_{phant}(s)$$

The above equations for trues and randoms rates apply whether or not scattered events S are included in T. Therefore:

$$(T+S)_{pat}(s) = \frac{(T+S)_{pat}(s_{pat}^{meas})}{(T+S)_{phant}(s_{pat}^{meas})}(T+S)_{phant}(s)$$

The scatter fraction $S_f = S/(T+S)$ varies only slightly with count rate. As a result, T(s) and (T+S)(s) have nearly the same shape. (T+S) is the net trues, defined by the difference between the prompt and delayed coincidences. (T+S) is measured directly, and T is estimated by subtracting an estimate of the mean scatter distribution. The scatter sinogram is determined using a technique such as a simulation algorithm, convolution, curve fitting, or multiple energy windows. For a noisy scatter estimate, such must be accounted for in the computation of the SNR. R is estimated in any of several methods. Namely, R is estimated directly from a delayeds sinogram, as a fraction of the total delayeds rate assuming a uniform distribution and using an attenuation mask, or from the spatial distribution of the singles rates. Once T, S and R are known, the SNR is estimated as a function of the singles rate.

Activity in the patient, and therefore injected dose, is related to the singles rate in a similar manner to the one described above. For a given object, the variation of the singles rate with activity departs from linearity only due to the dead time in the block analog channels. As long as the incident photon flux is reasonably uniform, the dead time is similar and the activity A as a function of the singles rate depends on the object only via a scale factor. Therefore, a phantom measurement of activity vs. singles is calibrated to a single patient acquisition to determine the patients dose response curve:

$$A_{pat}(s) = \frac{A_{pat}(s_{pat}^{meas})}{A_{phant}(s_{pat}^{Meas})} A_{phant}(s),$$

where A represents either a total activity, or a mean activity concentration per mass or volume.

Over the clinical range, A is a monotonic function of s and consequently can be inverted to give s as a function of $A_{pat}$. Therefore the formula for $A_{pat}(s)$ given above is used to relate T, S, and R to A. Injected dose $D_{inj}$ is proportional to A with the proportionality constant being the product of a decay factor and an excretion fraction. Therefore $D_{inj}$ may be used instead of A in the equation given for $A_{pat}(s)$ above, since $D_{inj}$ is the directly measured quantity. $SNR(D_{inj})$ is then determined. Likewise, SNR is determined as a function of any quantity related to activity, such as uptake period; excretion fraction; and dose fractionation, that is, a dose administered in several partial doses.

Knowledge of $SNR(D_{inj})$ permits determination of several quantities relating to data quality. These qualities include peak SNR, optimal dose, SNR deficit, dose deficit, and differential dose benefit. The peak SNR is the maximum SNR that could have been realized for any dose or uptake, neglecting redistribution. Optimal dose is defined as the dose that would have achieved peak SNR, all else being the same. The SNR deficit is the difference or ratio between actual and peak SNR, Dose deficit is defined as the additional dose needed to achieve peak SNR. Finally, the differential dose benefit is the incremental increase in SNR per unit incremental increase in dose. Alternatively, a value of SNR less than the peak value may be defined as the optimal operational point, for example 90-95% of peak SNR; and the optimal dose may be defined as the minimum dose needed to achieve this SNR value. Because the peak of $SNR(D_{inj})$ is frequently quite broad, a large reduction in injected dose results in only a small reduction in SNR.

According to standard clinical protocol a patient is injected with radiopharmaceutical only once and an uptake period must elapse prior to scanning. Thus by the time T, S, and R can be determined by conventional methods, it is too late to adjust the close to improve performance. However, in accordance with the method of the present invention, modified protocols may be employed. Specifically, the dose may be fractionated, with a small calibration dose given initially. After a short uptake, the patient is pre-scanned for a short period timed only long enough to determine T, S, and R. The duration of the pre-scan is as short as a few seconds. From T, S, and R, an optimal dose is determined and the remainder injected. Calibration is performed by either a standard scanner, or on a special calibration device consisting of as few as two detectors. Spatial resolution is not necessarily required. A scan is optimizable for various scanner parameters by employing $SNR(D_{inj})$ estimates for such parameters. These parameters include, for example, the lower level discriminator setting (LLD).

The optimal dose for one anatomical position in the patient is generally not the same as for others. Knowledge of SNR $(D_{inj})$ for each position permits a global optimization to be performed. Frequently, individual patients are scanned multiple times, as for instance when they are undergoing radiation treatment or chemotherapy. In such cases knowledge of SNR $(D_{inj})$ acquired in the first scan is useful for optimizing subsequent scans.

Because optimal SNR occurs within a very narrow range of singles rates for a variety of patient weights and anatomical positions, it is only necessary to measure the singles rate to get an accurate assessment of whether the injected dose was optimal.

In an alternate embodiment of the present invention, noise equivalent count rate (NECR) is employed as the performance metric, as opposed to SNR. Where the scatter and randoms fractions are not known, pseudo-NECR (PNECR) is also useful. PNECR has a dependence on the singles rate similar to NECR, but does not account for differences in scatter fractions among different objects. Accordingly, PNECR is not useful for giving an absolute estimate of differences in performance between objects. Nevertheless, PNECR is useful for determining the optimal dose and the performance deficit ratio for a given scan, as well as a differential dose benefit.

In the alternate method for analyzing clinical PET count rate performance using NECR, net trues (prompts–delayeds) and randoms (delayeds) count rate responses measured on a reference phantom are matched to the actual patient data. An estimated response curve is then used to compute a performance metric closely related to the NECR as a function of the total singles event rate in the system. From this, the peak performance value relative to the measured performance is determined for any individual acquisition. This maximum performance value is largely independent of the magnitude of the activity present in the patient at the time of the acquisition, but depends mainly on the emitter and attenuator distributions. The peak count rates are then used to derive frame durations for equivalent noise, and correlated with patient weight. The singles rate is also determined. From the singles rate, the activity necessary to achieve maximum performance is determined and, based on the known activity in the patient, the optimal injected dose is determined.

Expressed in terms of the total (scatter corrected) trues (T), randoms (R) and scatter (S) count rates, the integral Poisson noise equivalent count rate (NECR) for the scatter and randoms corrected measured data is expressed as:

$$NECR = \frac{T^2}{T+S+kR} = \frac{(P-D)^2(1-S_f^{tot})^2}{P+(k-1)D-S_{out}-kR_{out}}$$

Here, k=2 for online randoms subtraction and 1 when a smooth randoms estimate is employed. R and S include counts only from LORs passing through the patient. P is the total prompts rate, D is the total count rate in a delayed coincidence window, and $S_{out}$ and $R_{out}$ are respectively the scatter and randoms events that lie outside of the patient. $S_f^{tot}=(S+s_{out})/(P-D)$ is the total scatter fraction. Typically, $S_{out}$ is a small fraction of the net trues (P–D)—about 15% for a 20 cm diameter cylinder, and less for patients. An average patient's thorax and abdomen subtend approximately 47% of the sinogram for a full ring scanner of the type considered here. If the randoms are uniformly distributed, then $2R_{out} \approx D$. NECR is therefore approximated by:

$$NECR \approx (1 - S_f^{tot})^2 \frac{(P-D)^2}{P + (k/2 - 1)D}$$

The prefactor affects the scale of the NECR, but not the relative performance of two scans of objects having similar scatter fractions. Thus the prefactor is dropped and a pseudo-NECR (PNECR) metric is defined for evaluating the effects of dose, uptake and frame duration on data quality for a specific object:

$$PNECR = \frac{(P-D)^2}{P + (k/2 - 1)D}$$

PNECR, unlike NECR, is easily computed from the total prompt and delayed coincidence event rates without explicit knowledge of the scatter and randoms within the patient. If online randoms subtraction is used for randoms correction, so that k=2, then the denominator (P+(k/2−1)D) is simply P.

The net trues (P−D) and delayeds (D) count rate curves are modeled as functions of singles rate in the same manner as described for (T+S) and R, and are fit to the patient data by simple scaling. From this, PNECR(s) is computed. A continuous representation of the model curves of (P−D) and D may be obtained by fitting appropriate functional forms to the phantom data. PNECR(s) is computed for each bed position for which the coincidence rates are evaluated at the patients singles rate. The actual measured PNECR point will fall on this curve, and its deficit relative to the peak PNECR value is then determined. Since for a single patient and bed position the scatter fraction is fixed, the ratio of actual to peak PNECR accurately reflects the NECR deficit as well. Further, the peak PNECR, unlike the measured PNECR, is largely independent of the activity present in the patient, and hence of the dose and uptake period. Accordingly, the peak PNECR is also a useful quantity to correlate with other factors, such as patient weight, that affect data quality.

Knowing the peak singles rate, defined as the singles rate at the peak PNECR, compared to the measured singles rate, the difference in the activity present in the patient that would have been necessary to achieve peak performance is predicted. The transformation from singles rate to activity is based on the reference phantom scan. That ratio of activity A in the phantom at the patient's peak singles rate to the phantom activity at the measured singles rate in the patient gives a correction factor for the patient's activity as:

$$\frac{A_{peak}^{patient}}{A_{actual}^{patient}} = \frac{A^{phantom}(s_{peak}^{patient})}{A^{phantom}(s_{actual}^{patient})}$$

This activity ratio, as in the case using $SNR(D_{inj})$ described above, is applied to the actual injected dose to predict the optimal dose. The optimal dose is then decay corrected to a standard uptake period such as one hour. The optimal dose is not sensitive to the elimination of part of dose, so long as the eliminated fraction remains constant.

Based on knowledge of the singles rate at the peak PNECR, the ratio of the patients activity at the time of the scan to that which would have been required to achieve maximum performance is estimated.

A means of determining SNR(s), NECR(s) or PNECR(s) for each individual scan of a patient population is described. Alternatively such a population may be represented by average SNR(s), NECR(s) or PNECR(s) curves determined in a number of ways, for example, by using a least squares algorithm to fit the scaling parameters of the average response curves to the patient data.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A method for improving clinical data quality in Positron Emission Tomography (PET) is disclosed. In the method of the present invention, data is processed to accurately and efficiently determine a data signal-to-noise ratio (SNR) corresponding to each individual clinical patient scan, as a function of a singles rate in a PET scanner. The method of the present invention relates an injected dose $D_{inj}$ to the singles rate to determine $SNR(D_{inj})$. The method of the present invention further provides an accurate estimate of a quantity proportional to SNR, the estimate being similar in function to the $SNR(D_{inj})$, but being simpler to compute. The method of the present invention has several applications for assessment and optimization of clinical PET data quality.

The single photon event rate in a detector channel depends on several factors. Among these are the activity a in the patient, the solid angle of the detector for the emitted radiation, the attenuation of the radiation between the emission point and the detector, the efficiency of the detector for the incident photon, and the loss probability of the event due to dead time and pile-up in the detector. Of these factors, the dead time and pile-up depend on the incident event rate. The measured true and random coincidence rates depend on all of these factors, as well as losses in the multiplexors that compress the signals between the detectors and the coincidence processor. Multiplexing losses also depend on event rate. Singles do not experience multiplexing losses on PET scanners in which they are counted at the input of the multiplexors, such as those manufactured by CTI Pet Systems, Inc. (CPS), Knoxville, Tenn. For a pair of detectors, i and j, these relations are expressed as:

$s_i = d_i(a)\epsilon_i a;$ $s_j = d_j(a)\epsilon_j a;$ $t_{ij} = [d_i(a)m_i(a)\epsilon_i a] d_j(a) m_j(a)\epsilon_{ji};$ and $r_{ij} = [d_i(a)m_i(a)\epsilon_i a][d_j(a)m_j(a)\epsilon_j] 2\tau,$ where s, t, and r are the singles, trues and randoms rates, respectively, d and m are the dead time/pile-up and multiplexing loss functions, respectively, and $\tau$ is coincidence resolving time. The randoms rate may also include a small contribution from multiple events, depending on the design of the system. However, such contribution is negligible in the present method.

$\epsilon_i$ is a factor which includes the solid angle, attenuation and detector efficiency. $\epsilon_{ij}$ is the probability that a photon will interact in detector j given that its annihilation partner is detected in i. $\epsilon_i$ and $\epsilon_{ij}$ depend on the distribution of the activity but not its magnitude, so they are not count rate dependent. Over the clinical range of activity, s is a monotonically increasing function of a. Therefore t and r are expressed as functions of the appropriate singles rates:

$t_{ij} = \epsilon_{ji} d_j(s_j) m_i(s_i) m_j(s_j) s;$ and $r_{ij} = 2\tau m_i(s_i) m_j(s_j) s_i s_j.$ With this, nearly all of the dependence on the object (due to variations in $\epsilon_i$) has been absorbed into the measured singles rates. The multiplexing loss depends on the singles rates in all of the input channels, so an object dependent change in the distribution of these rates could minimally affect $m_i s_i$. Thus $r_{ij}(s_i, s_j)$ is essentially independent of the object, while $t_{ij}(s_i, s_j)$ depends on it only through the scalar factor $\epsilon_{ij}$. Therefore, by measuring $r_{ij}$ and $t_{ij}$ as functions of the singles rates on a phantom, the corresponding functions for a patient are inferred by scaling the measured curves to patient data acquired at a single activity level, thereby determining the scale factors.

The above analysis is somewhat idealized in that the singles rate on most scanners is not measured for each individual crystal. In practice, the singles rate is measured as a total over many crystals. On the above exemplary CPS scanners, for example, singles rates are recorded as totals over three or four block detectors, each typically including 64 crystals. The dead time, pile-up and multiplexing losses are fundamentally functions of the block singles rates. However, as long as the singles rates are reasonably uniform over these block channels, or more generally, if the distribution of singles does not vary appreciably over this group of three or four blocks for different objects, then the analysis is also valid when applied to these integral rates.

The above description is applicable to individual lines of response (LORs). However, typically of interest is the characterization of data quality of a region of the sinogram, including a portion of the data volume, or the entire data volume. The data quality is characterized in terms of intergral count rates over the region of interest, the total trues, randoms and singles:

$$T = \sum_{ij \in ROI} w_{ij} t_{ij}$$

$$R = \sum_{ij \in ROI} w_{ij} r_{ij};$$

and $$s = \sum_{i \in ROI} s_i,$$

where $w_{ij}$ is a sinogram weighting factor that may be defined similarly to those described by R. H. Huesman, id.

T and R are characterized in terms of the integral single rate. In general, T and R are not singled valued functions of s where large variations exist in the distribution of the singles among the various channels for different objects, due to the nonlinear dependence of the loss functions on the channel count rates. However, in clinical imaging, the distribution of singles events among the detector channels tends to be fairly uniform, with a variation of less than a factor of two. The inclusion of many channels, as for instance when the total counts in the sinogram are considered, tends to average out differences among the dead time, pile-up and multiplexing losses. Therefore, for any fixed object position, emitter distribution, and fixed scanner configuration, only the strength of the activity varies, and the integral rates T(s) and R(s) have simple functional forms defined as:

$$T(s) = c^T s f^t(S); \text{ and}$$

$$R(s) = c^R s^2 f^R(s),$$

where s represents the total measured singles rate, $C^T$ and $C^R$ are constants, and $f^T$ and $f^R$ are functions that account for data losses due to dead time, pile-up and multiplexing, but depend very little on the nature of the object being scanned. The object dependence is nearly entirely encapsulated in the scale factors $c^T$ and $c^R$. These results have been validated through a set of phantom measurements as described below. $f^T(s)$ and $f^R(s)$ depend very little on most scanner configuration parameters such as the pulse integration time, the energy discriminator settings, and the coincidence time window. $f^T(s)$ and $f^R(s)$ have similar, but not Identical shapes.

Count rate models in which the independent variable is the integral single event rate of the scanner, s, have been discussed. However, alternative methods exist that serve as the model parameter in place of s. A measurable quantity is acceptable if it is uniquely related to the trues and randoms count loss fractions over the range of count rates of interest, without regard to the nature of the object being scanned; and if it exhibits a monotonic relation to the amplitude, A, of the activity present in the body over this range, for a given, fixed scan configuration. For parameter p, these criteria are equivalent to the live times $f^T(p)$ and $f^R(p)$ being well defined functions of p that are independent of the scanned object, and that p(A) measured for a phantom is invertible to give A(p).

In general, p may be any directly measured or derived quantity that is or could be employed to provide a dead time or count loss correction in a PET tomograph. Such quantities include, for example, the output of a live-time clock, the output of a pulse propagation circuit, and a quantity derived from the randoms coincidence rate itself. p may be either a scalar or vector quantity, for instance, either the integral singles rate, or a vector representing the singles rates in each detector. In any of these cases, p may be used in place of s to model the count rate response in clinical scans.

T(s) and R(s) are measured for a given scanner at one or more values of s using a phantom. The phantom is selected from a 70 cm long, 20 cm diameter phantom specified by the NEMA NU 2-2001 standard, an anthropomorphic phantom, or another appropriate distribution. The discrete measured values are interpolated or extrapolated using a polynomial or other appropriate function. From a patient measurement at a single activity level, the trues and randoms rates at any singles rate are determined according to:

$$T_{pat}(s) = \frac{T_{pat}(s_{pat}^{meas})}{T_{phant}(s_{pat}^{meas})} T_{phant}(s);$$

and $$R_{pat}(s) = \frac{R_{pat}(s_{pat}^{meas})}{R_{phant}(s_{pat}^{meas})} R_{phant}(s).$$

The above equations for trues and randoms rates apply whether or not scattered events S are included in T. Therefore:

$$(T+S)_{pat}(s) = \frac{(T+S)_{pat}(s_{pat}^{meas})}{(T+S)_{phant}(s_{pat}^{meas})}(T+S)_{phant}(s)$$

The scatter fraction $S_f = S/(T+S)$ varies only slightly with count rate. As a result, T(s) and (T+S)(s) have nearly the same shape. (T+S) is the net trues, defined by me difference between the prompt and delayed coincidences.

Depending on the application, the scatter and randoms rates refer to either the total field of view (FOV), or to lines of response (LORs) passing through a region of interest, such as the body. The randoms rate may or may not include multiple events, depending on the architecture of the scanners coincidence processor. The single photon rate is measured either before or after multiplexing losses.

(T+S) is measured directly, and T is estimated by subtracting an estimate of the mean scatter distribution. The scatter sinogram is determined using a technique such as a simulation algorithm, convolution, curve fitting, or multiple energy windows. For a noisy scatter estimate, such must be accounted for in the computation of the SNR, R is estimated in any of several methods. Namely, R is estimated directly from a delayeds sinogram, as a fraction of the total delayeds rate assuming a uniform distribution and using an attenuation mask, or from the spatial distribution of the singles rates. Once T, S and R are known, the SNR is estimated as a function of the singles rate.

Activity in the patient, and therefore injected dose, is related to the singles rate in a similar manner to the one described above. For a given object, the variation of the singles rate with activity departs from linearity only due to the dead time in the block analog channels. As long as the incident photon flux is reasonably uniform, the dead time is similar and the activity A as a function of the singles rate depends on the object only via a scale factor. Therefore, a phantom measurement of activity vs. singles is calibrated to a single patient acquisition to determine the patients dose response curve:

$$A_{pat}(s) = \frac{A_{pat}(s_{pat}^{meas})}{A_{phant}(s_{pat}^{Meas})} A_{phant}(s),$$

where A represents either a total activity, or a mean activity concentration per mass or volume.

Over the clinical range, A is a monotonic function of s and consequently can be inverted to give s as a function of $A_{pat}$. Therefore the formula for $A_{pat}(S)$ given above is used to relate T, S, and R to A. Injected dose $D_{inj}$ is proportional to A with the proportionality constant being the product of a decay factor and an excretion fraction. Therefore $D_{inj}$ may be used instead of A in the equation given for $A_{pat}(s)$ above, since $D_{inj}$ is the directly measured quantity. $SNR(D_{inj})$ is then determined. Likewise, SNR is determined as a function of any quantity related to activity, such as uptake period; excretion fraction; and dose fractionation, that is, a dose administered in several partial doses.

Figure 2:
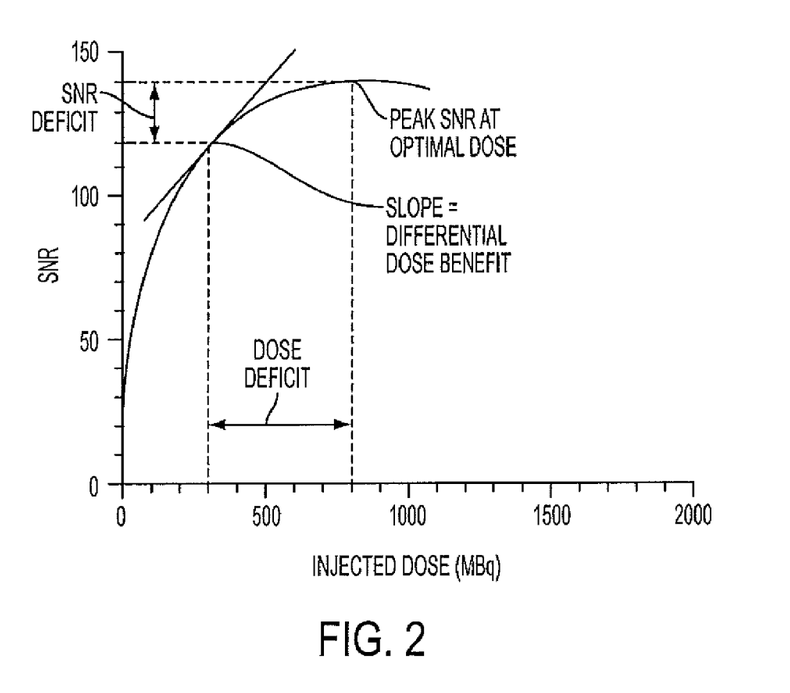
FIG. 2 is a graphical illustration of peak SNR, optimal dose, SNR deficit, dose deficit, and differential dose benefit, each related to data quality and optimization.

Knowledge of $SNR(D_{inj})$ permits determination of several quantities relating to data quality. These qualities include peak SNR, optimal dose, SNR deficit, dose deficit, and differential dose benefit. The peak SNR is the maximum SNR that could have been realized for any dose or uptake, neglecting redistribution. Optimal dose is defined as the dose that would have achieved peak SNR, all else being the same. The SNR deficit is the difference or ratio between actual and peak SNR. Dose deficit is defined as the additional dose needed to achieve peak SNR. Finally, the differential dose benefit is the incremental increase in SNR per unit incremental increase in dose. Each of these quantities is illustrated in FIG. 2, which graphically depicts the extraction of quantities related to data quality and optimization. Alternatively, a value of SNR less than the peak value may be defined as the optimal operational point, for example 90-95% of peak SNR; and the optimal dose may be defined as the minimum dose needed to achieve this SNR value. Because the peak of $SNR(D_{inj})$ is frequently quite broad, a large reduction in injected dose results in only a small reduction in SNR.

According to standard clinical protocol a patient is injected with radiopharmaceutical only once and an uptake period must elapse prior to scanning. Thus by the time T, S, and R can be determined by conventional methods, it is too late to adjust the dose to improve performance. However, in accordance with the method of the present invention, modified protocols may be employed. Specifically, the dose may be fractionated, with a small calibration dose given initially. After a short uptake, the patient is pre-scanned for a short period timed only long enough to determine T, S, and R, The duration of this pre-scan is as short as a few seconds. From T, S, and R, an optimal dose is determined and the remainder injected. Calibration is performed by either a standard scanner, or on a special calibration device consisting of as few as two detectors. Spatial resolution is not necessarily required. A scan is optimizable for various scanner parameters by employing $SNR(D_{inj})$ estimates for such parameters. These parameters include, for example, LLD.

The optimal dose for one anatomical position in the patient is generally not the same as for others. Knowledge of $SNR(D_{inj})$ for each position permits a global optimization to be performed. Frequently, individual patients are scanned multiple times, as for instance when they are undergoing radiation treatment or chemotherapy. In such cases knowledge of $SNR(D_{inj})$ acquired in the first scan is useful for optimizing subsequent scans.

Because optimal SNR occurs within a very narrow range of singles rates for a variety of patient weights and anatomical positions, it is only necessary to measure the singles rate to get an accurate assessment of whether the injected dose was optimal.

One important use of the method of the present invention is for quality assurance during a patient scan. It is a goal to scan a patient at or close to the optimal SNR. Determination of $SNR(D_{inj})$, and the SNR deficit, permit an assessment of the scan relative to this goal. Occasionally, due to unforeseen circumstances, a patient cannot be given a desired dose, or scanning is delayed beyond the desired uptake period. In such situations, the method of the present invention allows for the evaluation of the loss of data quality to assess the need for remedial action such as a repeat scan.

The method of the present invention is also useful as a quality check on the scanner itself. A single measurement on a standard phantom is used to generate an SNR(A) curve, which is compared to previous results to detect drifts or significant changes in scanner performance. This is easily incorporated into the current daily detector check performed on most PET scanners.

According to the method of the present invention, databases are developed relating patient characteristics such as weight, body mass index (BMI), sex, disease, diabetes state, anatomical position, and others to optimal dose, peak SNR and other data quality metrics. This is at best extremely difficult to perform without the ability to predict $SNR(D_{inj})$ on a per scan basis. While one could estimate a single SNR value for each scan, it would not be known whether the results could have been improved with a different dose. Using prior methods, a large number of repeat scans of nearly identical patients at many different doses and for each set of patient characteristics is required to achieve information similar to $SNR(D_{inj})$, which is not practical.

Using the method of the present invention, the optimal dose is known for each scan completed and is statistically correlated via the database with important patient characteristics such as weight. From the database, a quantitative estimate of optimal dose for new patients is made. Using prior methods, the relation between optimal dose and patient weight is not well understood. In some instances, the dose is increased for heavier patients, while in others it is not. The method of the present invention permits a rapid development of a definite answer to this protocol issue. For example, the method of the present invention has shown that the optimal dose depends very weakly on patient weight, at least on average, suggesting that protocols can accommodate the lower SNR of heavier patients only by increasing scan time.

It is foreseen that multiple sites can share data collected using the method of the present invention to improve statistics. A software interface allows an optimal dose and scan time to be determined by entering a patient's characteristics such as weight, and causing the optimal dose and SNR distributions for all similar patients to be displayed.

Given knowledge of SNR for each bed position, scan times are adjusted to equalize SNR across the body, subject to constraints such as total scan time. For continuous bed motion, bed speed is adjusted appropriately for different anatomical regions.

In one use of the method of the present invention, a SNR based on at least one local ROI as opposed to a global, integral SNR is employed. When a region of interest in an image is determined, the region is mathematically projected into the associated sinogram(s), and the data associated with this region is appropriately weighted, selected and used to estimate a local $SNR(D_{inj})$.

In an alternate embodiment of the present invention, noise equivalent count rate (NECR) is employed as the performance metric, as opposed to SNR. Where the scatter and randoms fractions are not known, pseudo-NECR (PNECR) is also useful. PNECR has a dependence on the singles rate similar to NECR, but does not account for differences in scatter fractions among different objects. Accordingly, PNECR is not as useful as NECR for giving an absolute estimate of differences in performance between objects. Nevertheless, PNECR is useful for determining the optimal dose and the performance deficit ratio for a given scan, as well as a differential dose benefit.

In the alternate method for analyzing clinical PET count rate performance using NECR, net trues (prompts−delayeds) and randoms (delayeds) count rate responses measured on a reference phantom are matched to the actual patient data. An estimated response curve is then used to compute a performance metric closely related to the NECR as a function of the total singles event rate in the system. From this, the peak performance value relative to the measured performance is determined for any individual acquisition. This maximum performance value is largely independent of the magnitude of the activity present in the patient at the time of the acquisition, but depends mainly on the emitter and attenuator distributions. The peak count rates are then used to derive frame durations for equivalent noise, and correlated with patient weight. The singles rate is also determined. From the singles rate, the activity necessary to achieve maximum performance is determined and, based on the known activity in the patient, the optimal injected dose is determined.

Figure 3:
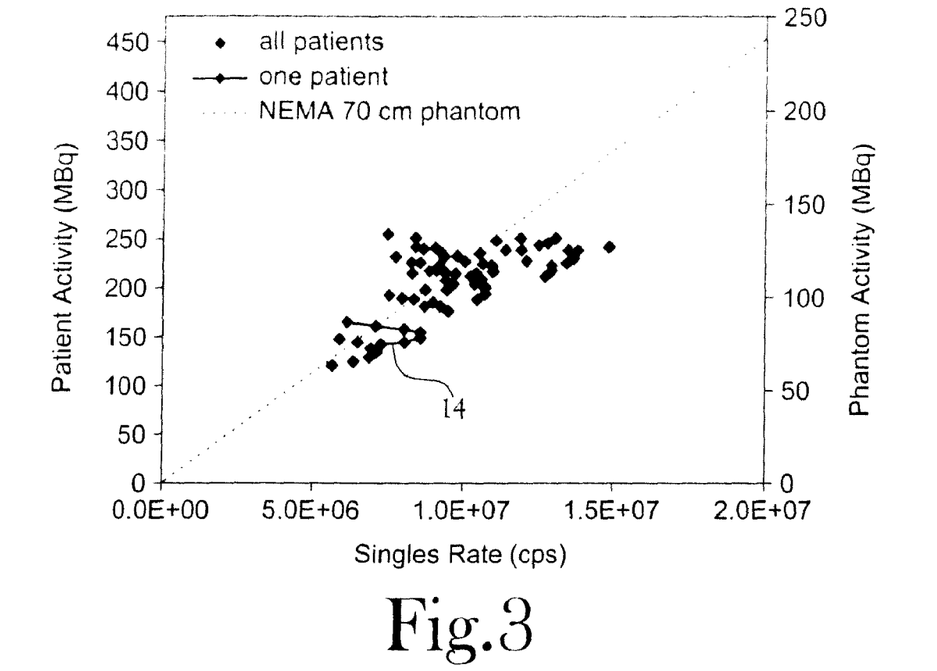
FIG. 3 is a graphical illustration of the correlation between singles count rate and activity for patients acquired with a PET/CT scanner having BGO scintillators and NEMA 70 cm phantom data.

Coincidence count rates are analyzed in terms of the total energy qualified singles rates in the detectors. Contrary to the expectation that the mean activity is well-correlated with the singles rate, as illustrated in FIG. 3 for individual multi-bed whole-body patient studies, it is not. FIG. 3 is a graphical illustration of the correlation between singles count rate and activity for patients acquired with a PET/CT scanner having BGO scintillators, and also includes NEMA 70 cm phantom data for the scanner. The activities are total activity in the phantom or patient at the time of the scan, averaged over the frame duration. The patient activities are based on injected dose and uptake period, with no correction for possible excretion. It can be seen that the total estimated activity in the patient, not allowing for urinary excretion of part of the dose, must be higher in a typical body than in the phantom to produce equivalent singles rates. This is likely due to the greater extent and attenuation of the body, as well as excretion.

For several of these studies the singles first increases then decreases as the total activity in the patient decreases, giving rise to a "boomerang" shaped trend, as shown at 14 for one patient study in FIG. 3. This is due to the motion of the bed to scan different regions of the body with varying concentrations of activity. Differences in patient weight can also lead to variation in singles rates for a given amount of activity present, due to differences in radiation absorption. Analysis in terms of the singles rates removes these first order effects of the emitter and attenuator distributions.

Figure 4:
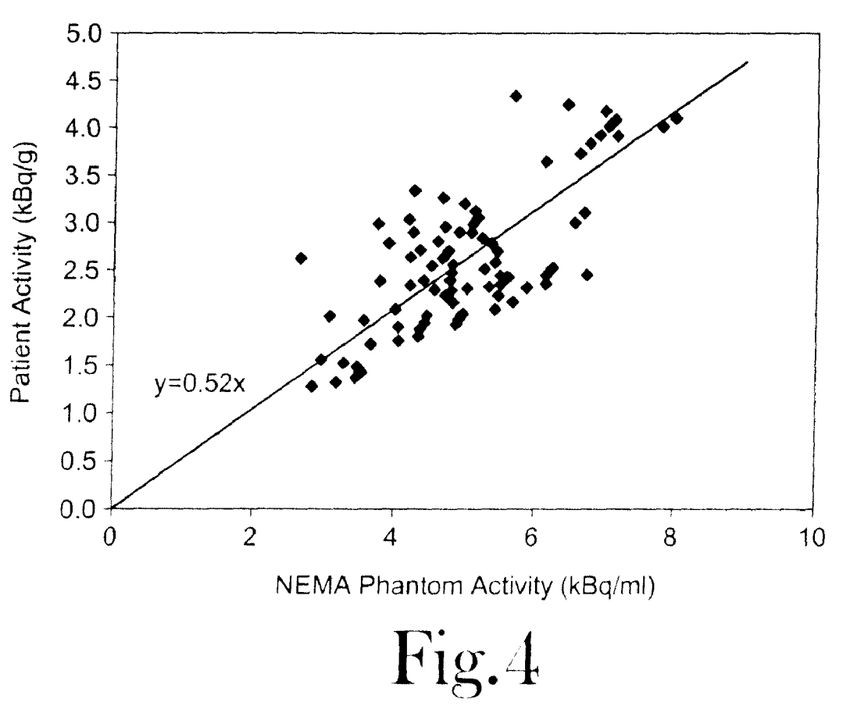
FIG. 4 is a graphical illustration of the correlation between activity concentrations for BGO PET/CT patient and NEMA 70 cm phantom data, with the equivalent phantom activities being estimated from the singles rates observed in the patients.

In the prior art, phantom performance results are related to patients by estimating an activity concentration in the patient, computed by dividing her total activity by her weight, and comparing this to the activity concentration in the phantom. In the method of the present invention, the patient and phantom data are compared at equivalent singles rates. As a result, the corresponding activity concentration in the phantom is significantly different from that in some patients. This is shown in FIG. 4 for the NEMA 70 cm phantom and the BGO PET/CT, where the equivalent phantom activities have been computed for each patient singles rate according to the trend seen in FIG. 3. FIG. 4 is a graphical illustration of the correlation between activity concentrations for BGO PET/CT patient and NEMA 70 cm phantom data, with the equivalent phantom activities being estimated from the singles rates observed in the patients. The patient activities are based on injected dose and uptake period, with no correction for possible elimination. A linear regression through the data is shown, with slope 0.52. For this patient sample, the equivalent phantom activity concentration is on average about twice the patients activity, or even greater considering the possible elimination of radioactivity from the patient that may have occurred. Care must therefore be taken when comparing phantom and patient count rate performance based on activity. This could imply very different photon flux environments. It is preferable to eliminate this object-dependent variability from the analysis.

Expressed in terms of the total (scatter corrected) trues (T), randoms (R) and scatter (S) count rates, the integral Poisson noise equivalent count rate (NECR) for the scatter and randoms corrected measured data is expressed as:

$$NECR = \frac{T^2}{T+S+kR} = \frac{(P-D)^2(1-S_f^{tot})^2}{P+(k-1)D-S_{out}-kR_{out}}.$$

Here, k=2 for online randoms subtraction and 1 when a smooth randoms estimate is employed. R and S include counts only from LORs passing through the patient. P is the total prompts rate, D is the total count rate in a delayed coincidence window, and $S_{out}$, and $R_{out}$ are respectively the scatter and randoms events that lie outside of the patient. $S_f^{tot}=(S+S_{out})/(P-D)$ is the total scatter fraction. Note that $P-D=T+S+S_{out}$. Typically, $S_{out}$ is a small fraction of the net trues (P-D)—about 15% for a 20 cm diameter cylinder, and less for patients. An average patients thorax and abdomen subtend approximately 47% of the sinogram for a full ring scanner of the type considered here. If the randoms are uniformly distributed, then $2R_{out} \approx D$. NECR is therefore approximated by:

$$NECR \approx (1-S_f^{tot})^2 \frac{(P-D)^2}{P+(k/2-1)D}.$$

The prefactor affects the scale of the NECR, but not the relative performance of two scans of objects having similar scatter fractions. Thus the prefactor is dropped and a pseudo-NECR (PNECR) metric is defined for evaluating the effects of dose, uptake and frame duration on data quality for a specific object:

$$PNECR = \frac{(P-D)^2}{P+(k/2-1)D}.$$

PNECR, unlike NECR, is easily computed from the total prompt and delayed coincidence event rates without explicit knowledge of the scatter and randoms within the patient. If online randoms subtraction is used for randoms correction, so that k=2, then the denominator (P+(k/2−1)D) is simply P.

It should be noted that the NEMA prescription for computing NECR using the 70 cm phantom cannot be followed on the LSO-based scanners discussed here due to the intrinsic background from the natural radioactivity of $^{176}$Lu. The randoms rate never falls below 1% of the trues rate. To obtain an accurate NECR estimate on these machines, both a prompts and delayeds sinogram are acquired and the actual randoms within the 24 cm region of interest specified by NEMA are computed, rather than estimating them based on the measured trues and scatter traction. This is a more exact procedure than the NEMA standard, and also accounts for the slight variation in scatter fraction observed as a function of activity.

Figure 5:
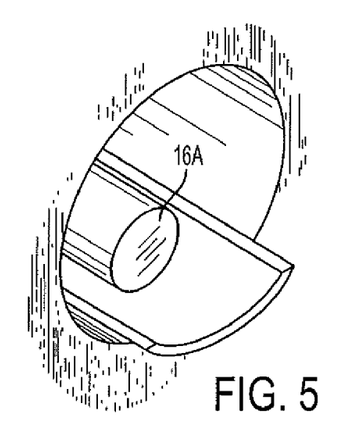
FIG. 5 illustrates a first phantom arrangement wherein a water-filled phantom having a diameter of 21 cm and a length of 23 cm is employed.
Figure 6:
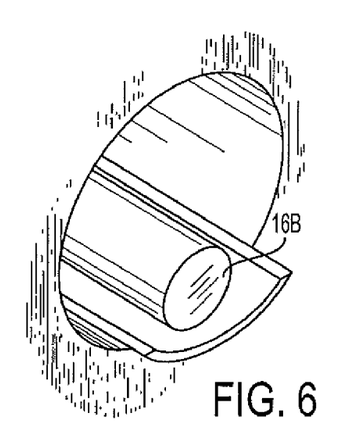
FIG. 6 illustrates a second phantom arrangement wherein a polyethylene phantom having a diameter of 20 cm diameter, a length of 70 cm, and a weight of approximately 22 kg. is employed.
Figure 7:
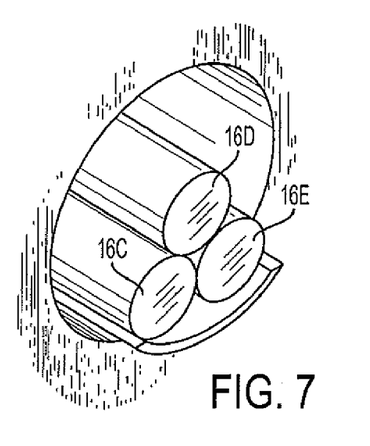
FIG. 7 illustrates a third phantom arrangement wherein two NEMA 70 cm phantoms and one water-filled phantom having a 21 cm diameter and a length of 70 cm long is employed.

To validate the use of PNECR as a relative performance measure, PNECR to true NECR have been compared on data from the three phantom arrangements shown in FIGS. 5-7. Illustrated in FIG. 5 is a phantom 16A having a diameter of 21 cm and a length of 23 cm. The phantom 16A in a uniform water-filled cylinder having an active volume of 20 cm diameter by 20 cm long and a weight of 6.5 kg. Illustrated in FIG. 6 is a phantom 16B having a diameter of 20 cm diameter, a length of 70 cm, and a weight of approximately 22 kg. The phantom 16B is fabricated from polyethylene phantom with a 22 kg line source as specified by NEMA. The third configuration, as illustrated in FIG. 7, includes two phantoms 16D, 16E, which are NEMA 70 cm phantoms, and a water-filled phantom 16C having a 21 cm diameter and a length of 70 cm long. The phantom 16D, disposed on the top of the illustrated stack, contains a standard NEMA line source. The lower two phantoms 16C,16E contain no radioactivity. The total weight of the phantoms 16C,16D,16E is approximately 70 kg.

Figure 8:
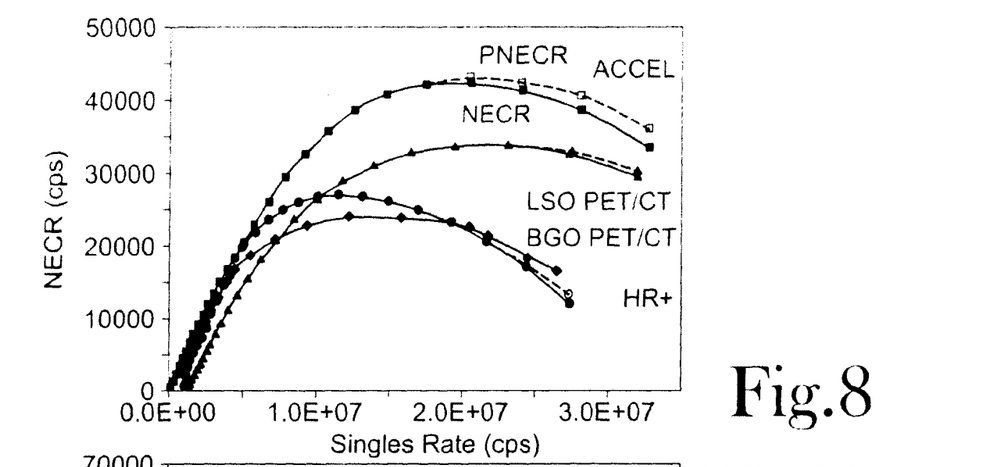
FIG. 8 illustrates a comparison between PNECR and NECR for NEMA 70 cm phantom count rate data acquired on four PET and PET/CT scanners.
Figure 9:
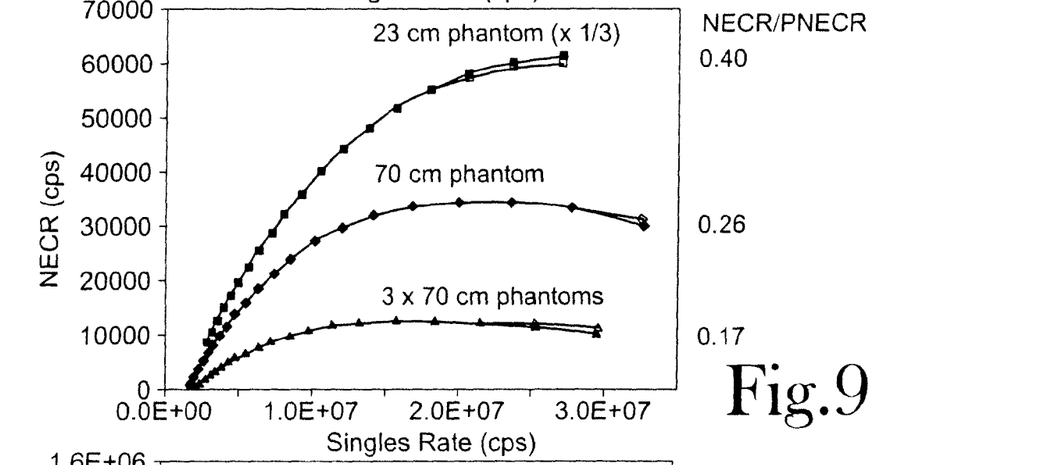
FIG. 9 illustrates a comparison of PNECR and NECR for acquisitions using the three different phantom arrangements of FIGS. 5-7, all acquisitions being made on an LSO PET/CT scanner.

FIG. 8 illustrates a comparison between PNECR and NECR for NEMA 70 cmn phantom count rate data acquired on four CPS Innovations PET and PET/CT scanners. These scanners included the EXACT HR+, the ACCEL, the BGO PET/CT and the LSO PET/CT tomographs. The HR+ and the BGO PET/CT both contain 288 BGO block detectors each of dimension 36×38.8×30 mm. The ACCEL and the LSO PET/CT both contain 144 LSO block detectors each of dimension 54×54×25 mm, All four scanners employed a lower level discriminator setting of 350 keV. All acquisitions were 3D with online randoms subtraction. The scale factors were 0.23-0.26. The dashed lines are PNECR values. The PNECR curves have been scaled to match the NECR values. FIG. 9 illustrates a comparison of PNECR and NECR for acquisitions using the three different phantoms, all on the LSO PET/CT. Scale factors of 0.40, 0.26 and 0.17 were used for the phantoms illustrated in FIGS. 5-7, respectively. In all cases illustrated in FIGS. 8 and 9, the shape of the PNECR curve closely resembles the actual NECR curve. Accordingly, the relative performance of clinical acquisitions using PNECR is evaluated.

In order to understand the count rate performance for a given patient and bed position study, the corresponding NECR or PNECR as a function of singles are desired. However, it is not practical to measure clinically due to the time required. Thus, PNECR is estimated as a function of singles for a patient study by fitting the net trues and delayeds as functions of singles, determined from a phantom study, to the patient data point as described previously for NECR and SNR. For any fixed object position and emitter distribution, (P–D) and D are simple functions of the singles rate, s, that depend on the object only through the scale factors $C^T$ and $C^R$:

$$P-D=C^T s F^T(s); \text{ and}$$

$$D=C^R s F^R(s),$$

where $F^T(s)$ and $F^R(s)$ are object-independent live time functions that are very similar to the functions $f^T(s)$ and $f^R(s)$, respectively, that are used to model T(or (T+S)) and R. The only difference is that here, (P–D) and D refer to total counts rather than those in some other ROI. To the extent that this approximation is accurate, PNECR(s) is predictable for the patient data.

Figure 10:
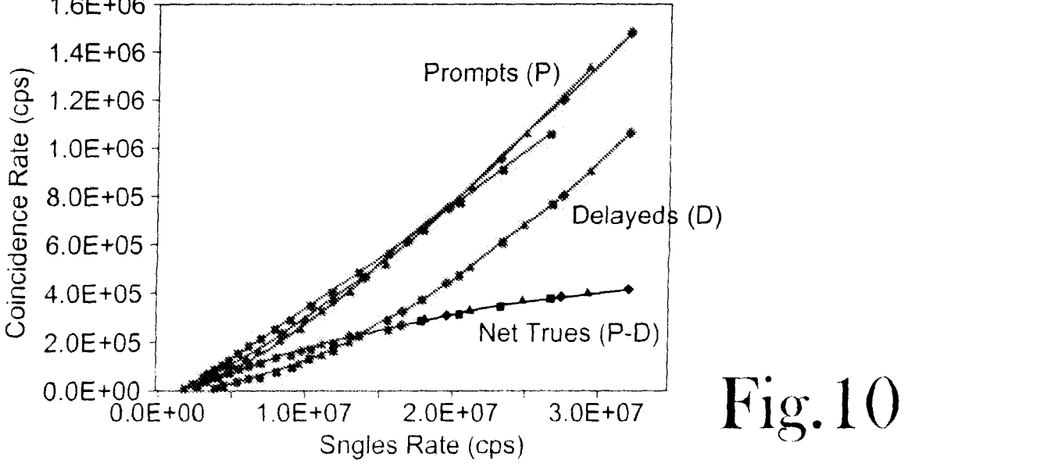
FIG. 10 illustrates a comparison between P, (P−D) and D for the three phantom count rate studies on the LSO PET/CT scanner illustrated in FIG. 9.

FIG. 10 illustrates a comparison between P, (P–D) and D for the three phantom count rate studies on the LSO PET/CT described above and graphically illustrated in FIG. 9. (P–D) and D have been independently scaled to match the NEMA 2001 count rate curves. The prompts shown are $C^T$(P–D)+ $C^R$D after this scaling. As shown, the agreement between the net trues and delayeds curves for these three very different phantoms is quite good. Accordingly, the net trues and delayeds count rate curves are fit to the patient data by simple scaling. From this, PNECR(s) is computed. It is not essential to the present invention that the NEMA 2001 phantom be used as the reference scan. Other phantoms are useful for providing an accurate match for net trues and delayeds in patient data, and may be used to generate the model (P–D)(s) and D(s) curves within the spirit of the present invention.

A continuous representation of the model curves of (P–D) and D above is obtained by fitting appropriate functional forms to the phantom data. An average PNECR(s) is then computed for a set of patient scans by a least square fit of $C^T$ and $C^R$ to the data. More significantly, PNECR(s) is also computed for each bed position for which the coincidence rates are evaluated at the patients singles rate. The actual measured PNECR point will fall on this curve, and its deficit relative to the peak PNECR value is then determined. Since for a single patient and bed position the scatter fraction is fixed, the ratio of actual to peak PNECR accurately reflects the NECR deficit as well. Further, the peak PNECR, unlike the measured PNECR, is largely independent of the activity present in the patient, and hence of the dose and uptake period. Accordingly, the peak PNECR is also a useful quantity to correlate with other factors, such as patient weight, that affect data quality.

Knowing the peak singles rate, defined as the singles rate at the peak PNECR, compared to the measured singles rate, the difference in the activity present in the patient that would have been necessary to achieve peak performance is predicted. The transformation from singles rate to activity is based on the reference phantom scan. That ratio of activity A in the phantom at the patient's peak singles rate to the phantom activity at the measured singles rate in the patient gives a correction factor for the patient's activity as:

$$\frac{A_{peak}^{patient}}{A_{actual}^{patient}} = \frac{A^{phantom}(s_{peak}^{patient})}{A^{phantom}(s_{actual}^{patient})}.$$

This activity ratio, as in the case using SNR(D) described above, is applied to the actual injected dose to predict the optimal dose. The optimal dose is then decay corrected to a standard uptake period such as one hour. The optimal dose is not sensitive to the elimination of part of dose, so long as the eliminated fraction remains constant.

Figure 11:
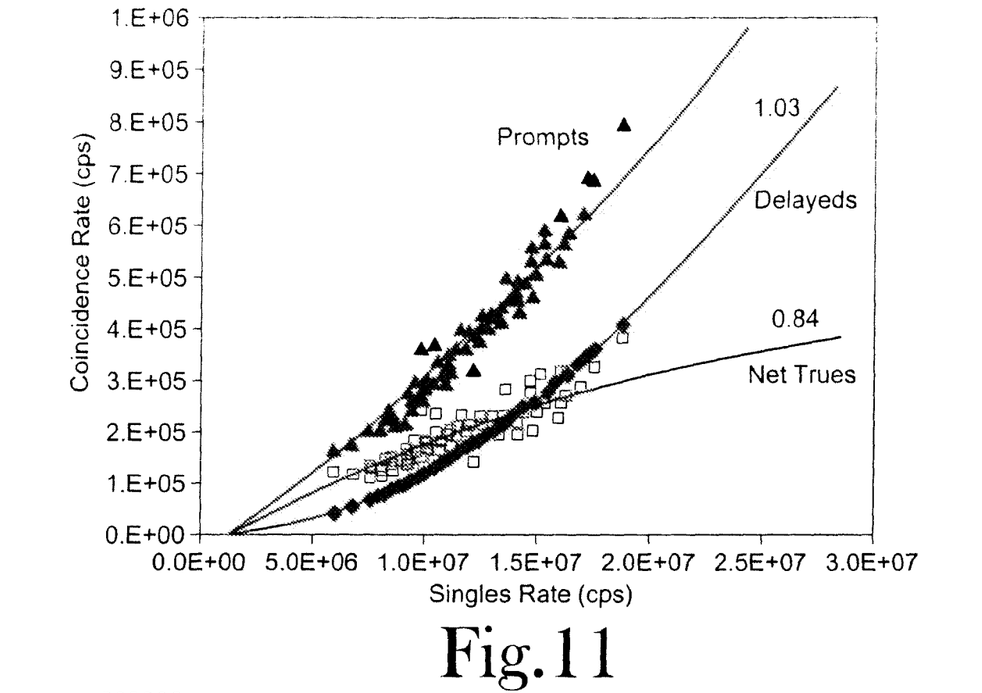
FIG. 11 illustrates a comparison of net trues and delayeds count rates measured for 93 bed positions in 15 patient studies on an ACCEL, with the fitted model curves from a NEMA 2001 count rate test.
Figure 12:
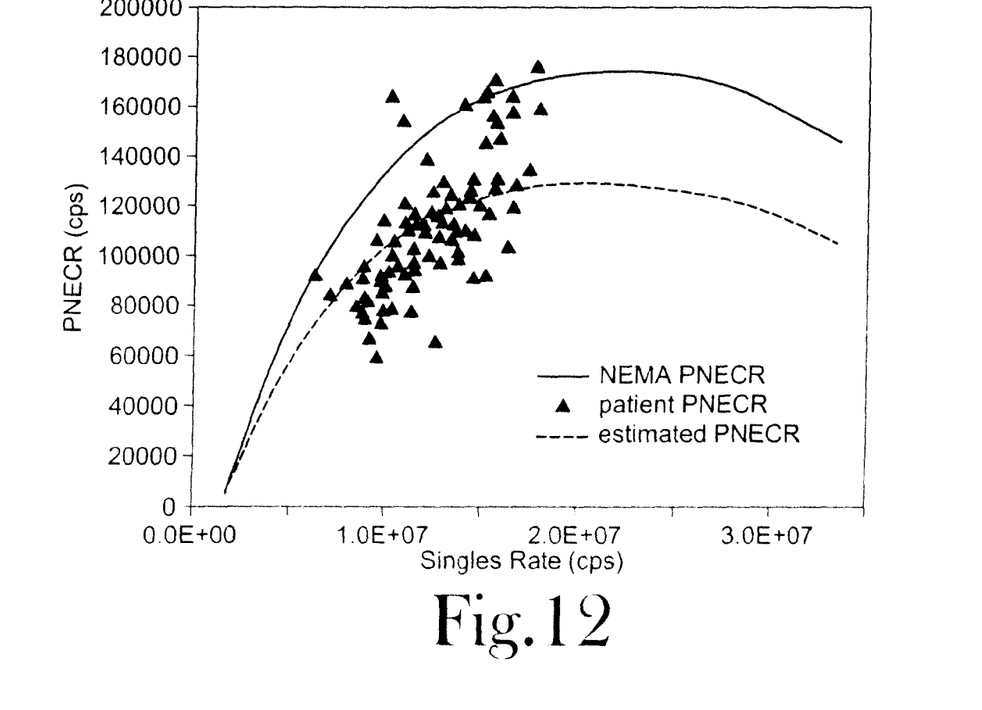
FIG. 12 illustrates an average PNECR predicted for the data set illustrated in FIG. 11, together with the actual PNECR for each bed position, and the PNECR curve for the NEMA 2001 reference phantom.

FIG. 11 illustrates a comparison of net trues and delayeds count rates measured for 93 bed positions in 15 patient studies on an ACCEL, with the fitted model curves from a NEMA 2001 count rate test. In this illustration, $C^T$=0.84 and $C^R$=1.03. The prompts curve is the sum of the scaled net trues and delayeds curves. Only $^{18}$F-FDG whole-body studies were included. The patient weight range was 54-109 kg, with an average and standard deviation of 79±16 kg. The injected doses ranged from 444 to 640 MBq, with an average and standard deviation of 555±53 MBq. The uptake periods to the start of the first bed position varied from 39 to 111 min, with an average and standard deviation of 59±17 min. From the fitted net trues and delayeds curves, an average PNECR for the data set is predicted as defined above. This is shown in FIG. 12 together with the actual PNECR for each bed position, and the PNECR curve for the NEMA 2001 reference phantom. On average the patient scans had somewhat lower PNECR than could have been achieved on the machine, possibly indicating the need for higher injected doses.

Figure 13:
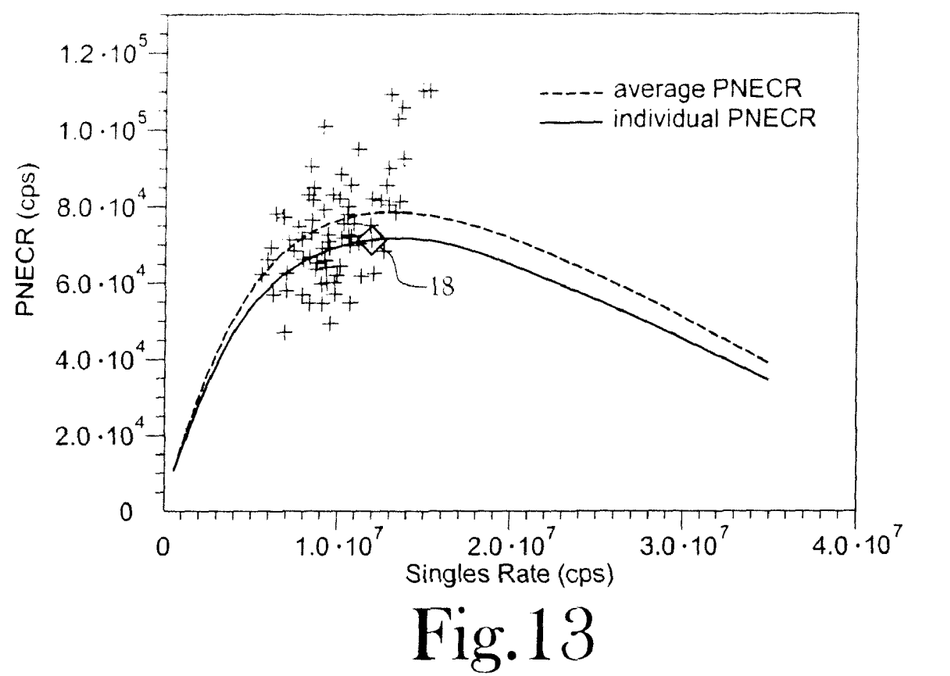
FIG. 13 illustrates the actual and average patient PNECR of a set of 17 clinical whole-body studies comprising 84 bed positions on a BGO PET/CT scanner.

A more powerful analysis is made by considering the PNECR curve corresponding to each individual acquisition. FIG. 13 illustrates the actual and average patient PNECR of a set of 17 clinical whole-body studies comprising 84 bed positions on a BGO PET/CT. The patient weight range was 57-100 kg, with an average and standard deviation of 81±12 kg. The injected doses ranged from 271 to 400 MBq, with an average and standard deviation of 354±35 MBq. The uptake periods varied from 60 to 95 min, with an average and standard deviation of 75±13 min. Also illustrated is the PNECR curve for a single one of the acquisitions for the heaviest patient in this group. The point 18 corresponding to this acquisition is outlined with a diamond shape in this and succeeding figures.

Figure 14:
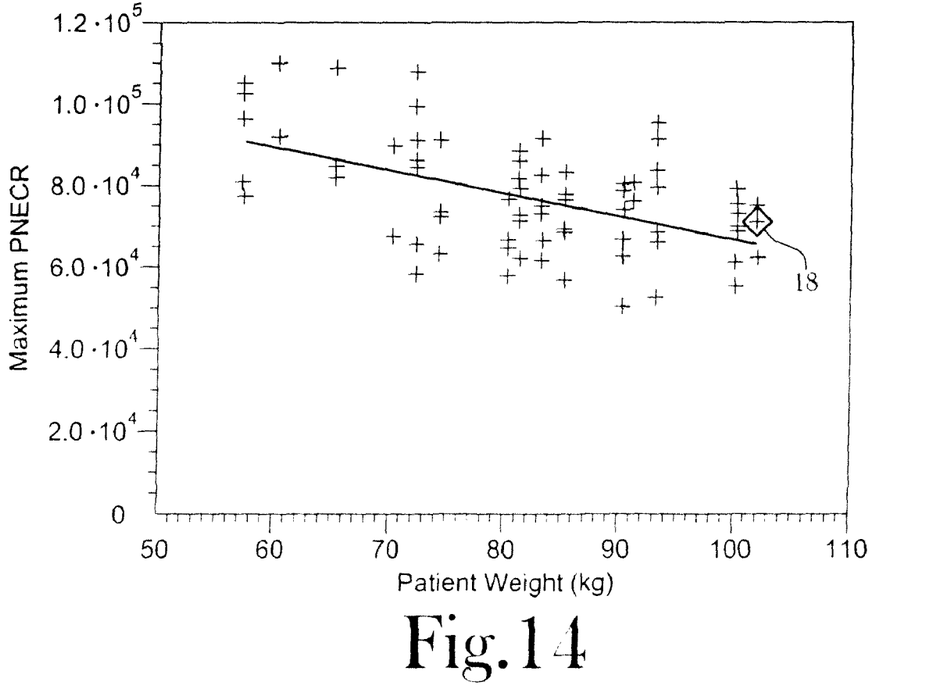
FIG. 14 illustrates the computed maximum value of each individual PNECR curve as a function of patient's weight.

For each individual PNECR curve, the maximum value is computed and plotted in FIG. 14 as a function of patients weight. These values are largely independent of the magnitude of the dose given the patient. FIG. 14 illustrates a decrease in this peak PNECR with increasing patient weight. The linear correlation coefficient between the peak PNECR and weight for this patient sample is −0.51. The linear regression line is shown as a solid line.

Figure 15:
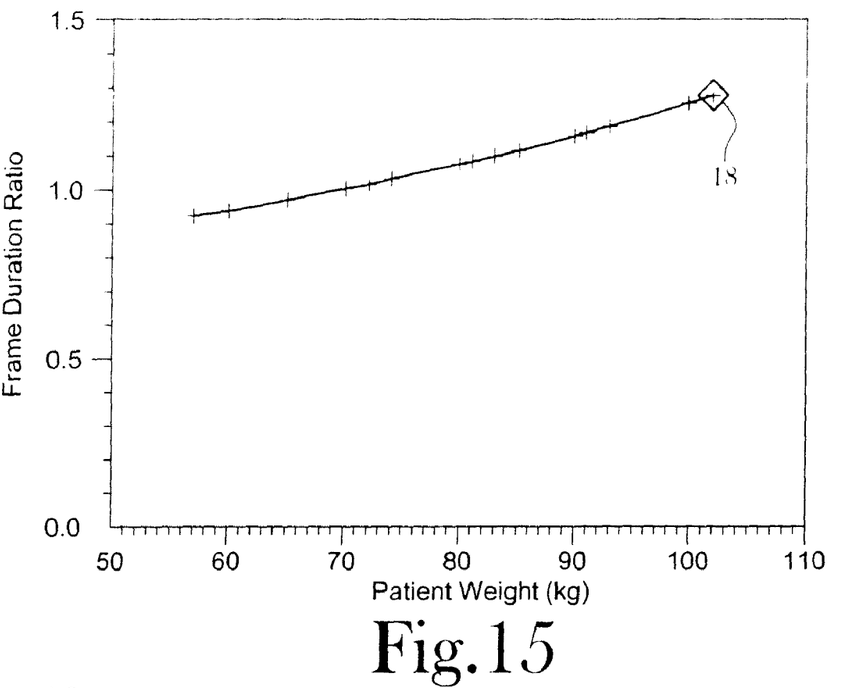
FIG. 15 illustrates an estimated scan duration, based on the trend of peak PNECR count rate versus weight illustrated in FIG. 14, to acquire an equal number of pseudo-noise equivalent counts at each weight, which is proportional to the reciprocal of the count rate, and normalized to unit scan time at 70 kg.

The trend of peak PNECR count rate versus weight shown in FIG. 14 is used to estimate the scan duration needed to acquire an equal number of pseudo-noise equivalent counts at each weight, which is proportional to the reciprocal of the count rate. This is illustrated in FIG. 15 normalized to unit scan time at 70 kg. True NECR, if available, might imply an even steeper trend due to variation in the scatter contribution. Nevertheless, the result illustrated in FIG. 15 suggests that a 100 kg patient should be scanned at least 25% longer than a 70 kg patient to achieve equivalent data SNR on this machine. The estimate of FIG. 15 does not account for bed-to-bed variations for a given patient, or variations in scatter fractions.

Figure 16:
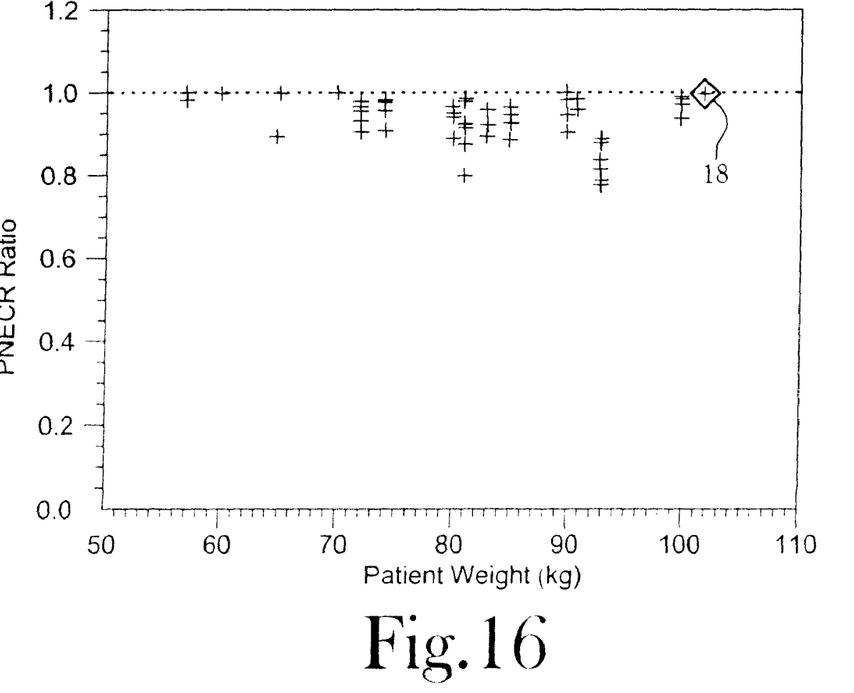
FIG. 16 illustrates the ratio of actual to maximum PNECR for individual acquisitions versus patient weight.

The ratio of actual to maximum PNECR for individual acquisitions versus patient weight is illustrated in FIG. 16. This ratio is not sensitive to the scatter fraction, and should closely resemble an NECR ratio. All of the acquisitions shown were acquired at approximately 80% or greater of their peak NECR. A higher performance ratio is generally seen for the lighter patients, although certain acquisitions in even the heaviest patients are close to optimal.

Figure 17:
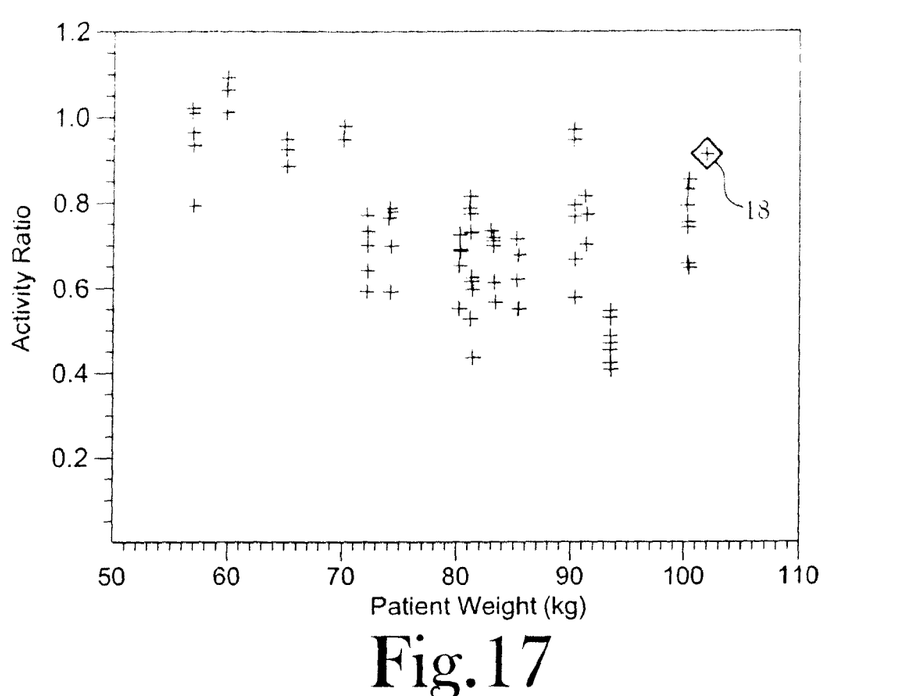
FIG. 17 illustrates an estimate of the ratio of the patient's activity at the time of the scan to that which would have been required to achieve maximum performance.
Figure 18:
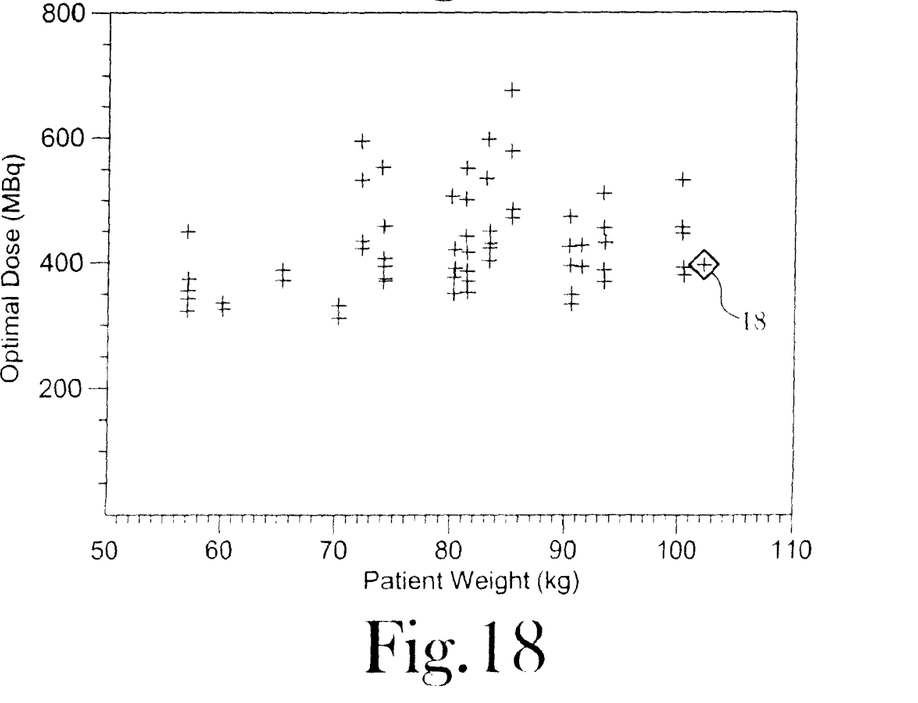
FIG. 18 illustrates predicted doses of $^{18}$F-FDG that would have been required to achieve the peak count rate, based on the activity ratios illustrated in FIG. 17, the predicted doses being decay corrected to an hour prior to each individual acquisition.

Based on knowledge of the singles rate at the peak PNECR, the ratio of the patients activity at the time of the scan to that which would have been required to achieve maximum performance is estimated. Again, this does not depend strongly on the scatter fraction. These ratios are illustrated in FIG. 17 as a function of weight. This ratio varies with bed position for a given patient. These ratios varied from 0.4 to 1.1 for the 89 acquisitions examined. These activity ratios are also used to predict the dose of $^{18}$F-FDG that would have been required to achieve this peak count rate. This does is illustrated in FIG. 18. The illustrated doses are decay corrected to an hour prior to each individual acquisition. The linear correlation coefficient between dose and weight here is 0.19.

From the foregoing description, it will be recognized by those skilled in the art that a new methodology for analyzing count rate performance of clinical PET data has been provided. In the method of the present invention, either the net trues and delayed coincidence rates, or the trues and randoms rates, if they were measured on patients as functions of qualified single event rates, are proportional to the corresponding trends measured in a reference phantom such as the NEMA 2001 70 cm cylinder. Therefore, a performance curve is estimated for each bed position of each whole-body scan, and the location of the actual acquisition on this curve is determined. The appropriate adjustments to scan duration and injected dose are then determined to best utilize count rate performance. The method of the present invention provides for the use of either of SNR, NECR, or PNECR as a meaningful measure of relative performance. SNR may be defined either globally or locally.

Performance metrics other than SNR, NECR and PNECR may also be employed in the method of the present invention. For example, the randoms/trues ratio, the live time ratio of T(s) to the linearly extrapolated T, and the trues rate are each useful with the present invention.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicants general inventive concept.

The invention claimed is:

1. A method for improving clinical data quality in Positron Emission Tomography (PET), said method comprising the steps of:
   (a) injecting a patient with a calibration dose of a radiopharmaceutical, said calibration dose being a fractionated portion of a patient dose of the radiopharmaceutical;
   (b) pre-scanning the patient;
   (c) determining a trues rate ($T_{pat}$);
   (d) determining a scattered events rate ($S_{pat}$);
   (e) determining a randoms rate ($R_{pat}$);
   (f) determining a singles rate $s_{pat}^{meas}$;
   (g) determining an optimal dose of the radiopharmaceutical using $T_{pat}$, $S_{pat}$, $R_{pat}$ and $s_{pat}^{meas}$;
   (h) determining a remainder dose as a difference between said optimal dose and said calibration dose; and
   (i) injecting said patient with said remainder dose.

2. The method of claim 1 wherein said step of determining a trues rate is performed by:

$$T_{pat}(s) = \frac{T_{pat}(s_{pat}^{meas})}{T_{phant}(s_{pat}^{meas})} T_{phant}(s);$$

wherein said step of determining a randoms rate is performed by:

$$R_{pat}(s) = \frac{R_{pat}(s_{pat}^{meas})}{T_{phant}(s_{pat}^{meas})} T_{phant}(s); \text{ and}$$

wherein said scattered events rate is included in determining said trues rate such that:

$$(T+S)_{pat}(s) = \frac{(T+S)_{pat}(s_{pat}^{meas})}{(T+S)_{phant}(s_{pat}^{meas})} (T+S)_{phant}(s);$$

wherein s is a total measured singles rate.

3. The method of claim 2 wherein T(s) and R(s) are measured for a given scanner at at least one value of s using a phantom.

4. The method of claim 2 wherein T(s) closely approximates (T+S)(s) in shape and wherein (T+S) defines a net trues rate, wherein (T+S) is measured directly, and wherein said trues rate is estimated by subtracting an estimate of a mean scatter distribution.

5. The method of claim 2 wherein said randoms rate is estimated using one of a group of methods including at least estimating said randoms rate directly from a delayeds sonogram, estimating said randoms rate as a fraction of a total delayeds rate assuming a uniform distribution and using an attenuation mask, and estimating said randoms rate form a spatial distribution of said singles rates.

6. The method of claim 2 further including the step of estimating a single-to-noise ration (SNR) as a function of said singles rate.

7. The method of claim 6 further including the step of relating said calibration dose to said singles rate by calibrating a phantom measurement of activity compared to said singles rate for a single patient acquisition to determine a dose response curve as:

$$A_{pat}(s) = \frac{A_{pat}(s_{pat}^{means})}{A_{phant}(s_{pat}^{Meas})} A_{phant}(s),$$

where A represents one of a total activity and a mean activity concentration per mass or volume.

8. The method of claim 7 wherein A is a monotonic function of s, wherein said calibration dose is related to A by a decay factor and excretion fraction, said method further comprising the step of substituting said calibration does for A.

9. The method of claim 1 further comprising the step of developing a database relating patient characteristics including at least weight, body mass index, sex, disease, diabetes state, and anatomical position to optimal dose and peak SNR.

10. The method of claim 9 further including the step of statistically correlating said optimal dose for each scan completed into said database.

11. The method of claim 9 further including the steps of:
(a) comparing said patient characteristics for a new patient with said database; and
(b) estimating said optimal dose for said new patient.

* * * * *